United States Patent
Fleetwood

(10) Patent No.: US 6,421,100 B1
(45) Date of Patent: Jul. 16, 2002

(54) METHOD AND APPARATUS FOR CHECKING THE ALIGNMENT OF A PROJECTION TELEVISION LENS

(75) Inventor: Stephen W. Fleetwood, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/222,907

(22) Filed: Dec. 30, 1998

(51) Int. Cl.$^7$ .............................. H04N 5/64; H04N 9/31
(52) U.S. Cl. ........................ 348/745; 348/806; 356/153
(58) Field of Search ................................. 348/744, 745, 348/746, 747, 806, 807, 811, 779, 781; 353/121, 122; 356/153, 154; 250/491.1; H04N 5/64, 9/31, 3/22, 5/74

(56) References Cited

U.S. PATENT DOCUMENTS

| | | | | |
|---|---|---|---|---|
| 3,724,953 A | * | 4/1973 | Johnston, Jr. | 356/153 |
| 3,907,436 A | * | 9/1975 | Wolga | 356/153 |
| 4,247,809 A | * | 1/1981 | Nessel | 318/630 |
| 4,938,570 A | * | 7/1990 | Majima et al. | 350/351 |
| 5,105,297 A | * | 4/1992 | Kessler et al. | 359/198 |
| 5,111,513 A | * | 5/1992 | Turner et al. | 382/8 |
| 5,506,719 A | * | 4/1996 | Murakami et al. | 359/216 |
| 6,137,547 A | * | 10/2000 | Iijima et al. | 348/789 |

* cited by examiner

Primary Examiner—John W. Miller
Assistant Examiner—Brian P. Yenke
(74) Attorney, Agent, or Firm—Edward W. Goodman

(57) ABSTRACT

An apparatus for checking the alignment of a projection lens assembly includes a base for mounting the apparatus on the projection lens assembly, a gimbal system having a bottom section mounted to the base and a top section, the gimbal system having position adjusters for adjusting the position of the bottom section in two orthogonal direction with respect to the base, and having tilt adjusters for angularly adjusting a plane of the top section with a plane of the base, and a laser generator mounted on the top section. The position adjusters and the tilt adjusters are used to position a laser beam to be emitted by the laser generation to be coaxial with a central axis of the projection lens assembly. When the laser generator is then energized, the laser beam forms a visible red dot on the rear projection screen and, using simple measurements, an operator is able to verify the alignment of the projection lens assembly in the rear projection television receiver.

2 Claims, 3 Drawing Sheets

METHOD AND APPARATUS FOR CHECKING THE ALIGNMENT OF A PROJECTION TELEVISION LENS

BACKGROUND OF THE INVENTION

1. Field of the Invention

The subject invention relates to projection television receivers and, more particularly, to the alignment of the lenses attached to CRT projection tubes in projection television receivers.

2. Description of the Related Art

Projection television receivers provide a way of generating a large television display at an affordable cost. Initially, projection televisions were only available as front projection two-piece combinations including a projector, having the appropriate tuning, audio and video processing circuits and video projecting tubes for projecting light beams containing the picture image, and a separate screen. As with known film projectors, a considerable amount of space is required for these two-piece combinations and care must be taken such that viewers of the display on the screen do not interrupt the light beams being projected to the screen from the projector. These two-piece combination units were followed by one-piece front projection television receivers which folded the light path from the projector to the screen so that both the projector and the screen could be in one housing. However, these one-piece units also required a considerable amount of space. Then followed the advent of rear projection television receivers in which the projector is situated inside the enclosure and projection lenses focus the picture image at an image plane co-planar with the rear projection screen inside of the enclosure. The resultant picture image is then viewable on the other side of the rear projection screen outside of the enclosure.

A rear projection television receiver is shown in FIG. 1. The rear projection television receiver includes a substantially rectangular cabinet 1 having an opening in a front face in which a rear projection screen 2 is ordinarily mounted. The cabinet 1 has mounted therein audio/video processing circuitry (not shown) typically found in television receivers, and a light box 3 containing three projection tubes (cathode ray tubes) for generating light beams modulated with the video signals for the three basic colors red, blue and green, respectively. For convenience, only one projection tube 4 is shown in FIG. 1. A projection lens assembly 5 is associated with the projection tube 4 for focussing the light beam 6 from the projection tube 4, this light beam being directed by mirrors 7 and 8 onto the rear projection screen 2.

In order to provide a satisfactory image on the rear projection screen 2, it is necessary to align the projection tube(s) 4 and the projection lens assembly (assemblies) 5 in the proper direction. Through the experience gained in assembling these rear projection television receivers, the cabinet 1 is manufactured with known mounting surfaces and positioning abutments for the mirrors 7 and 8 such that when mounted, the mirrors 7 and 8 will be in the proper orientation. Similarly, The cabinet 1 is manufactured with a mounting surface and positioning abutments for properly locating the light box 3, which, in turn, is fabricated with mounting surfaces and abutments for properly locating the projection tubes 4 therein. As such, the projection tubes 4 and the associated lenses 5 are "automatically" in proper alignment with the mirrors 7 and 8 and the rear projection screen 2. Once assembly of the rear projection television is completed, the alignment of the projection tubes/lenses may be finely adjusted electronically in a known manner.

Typically, this is done by activating the audio/video processing circuitry and applying, for example, a test pattern to the projection tube 4. However, as with all manufacturing operations, errors may creep in and, as such, the projection tubes/lenses end up being so far out of alignment that electronic adjustment thereof is impractical. The projection television receiver must then be removed from the assembly line, disassembled and retrofitted.

SUMMARY OF THE INVENTION

An object of the invention is to provide a method and apparatus for checking the alignment the lenses of a rear projection television receiver that may be easily performed prior to finishing the assembly of the projection television receiver.

This object is achieved with a lens alignment apparatus for a projection lens assembly of a projection tube in a rear projection television receiver, said apparatus comprising a base having a substantially flat bottom surface, said bottom surface having aligning pins protruding from the bottom surface of the base for frictionally engaging a circumferential surface of the projection lens assembly such that the bottom surface of the base is pressed against a front surface of the lens; a gimbal system having a bottom section mounted to the base, and a top section, said gimbal system having first adjusting means for adjusting the top section with respect to the base in two orthogonal directions in a plane parallel to a plane of the bottom surface of the base, and second adjusting means for angularly adjusting the plane of the top surface with respect to the plane of the bottom surface of the base; and a laser beam generating device mounted on the top section of said gimbal system, whereby said first and second adjusting means enable a laser beam emitted from the laser beam generating device to be coaxial with a central axis of the projection lens assembly.

In use, an operator calibrates the lens alignment apparatus by adjusting the first and second adjusting means such that the laser beam from the laser beam generating device is coaxial with a reference point on the lens aligning apparatus, this reference point being centered between the aligning pins, and such that the laser beam is orthogonal to the bottom surface of the base of the lens alignment apparatus. The lens alignment apparatus is then positioned on the projection lens assembly and then, by activating the laser beam generating device, a visible red laser beam is generated and reflected by the mirrors, forming a red dot on the rear projection screen 2. The operator may then check the alignment of the projection lens assembly 5 using simple measurements of the position of the red dot on the rear projection screen 2. The lens alignment apparatus is then be removed from the projection lens assembly 5. This is done when the light box is initially installed in the cabinet and can thus obviate unnecessary further assembly if there is an alignment problem.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
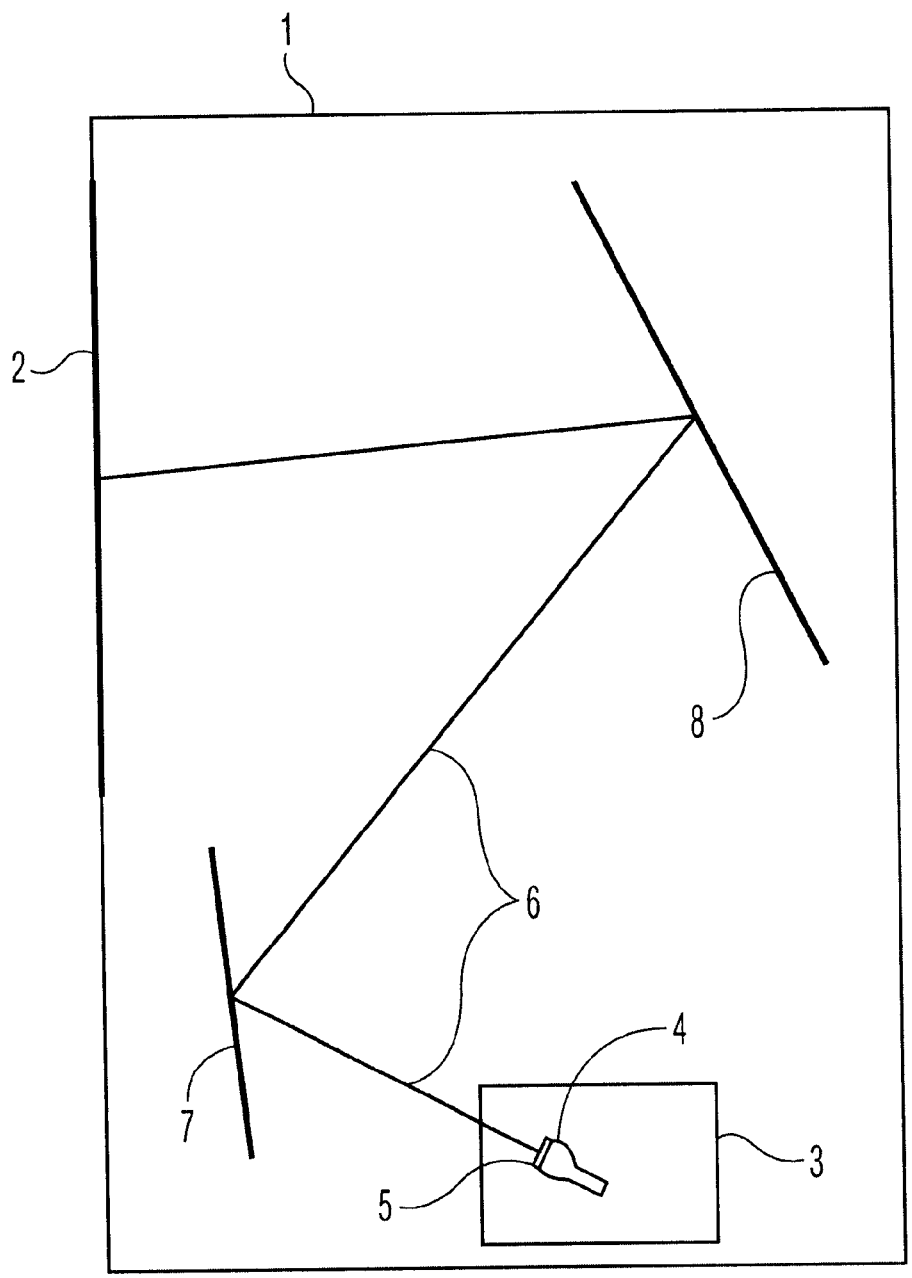
FIG. 1 is a drawing of a typical rear projection television receiver.
Figure 2:
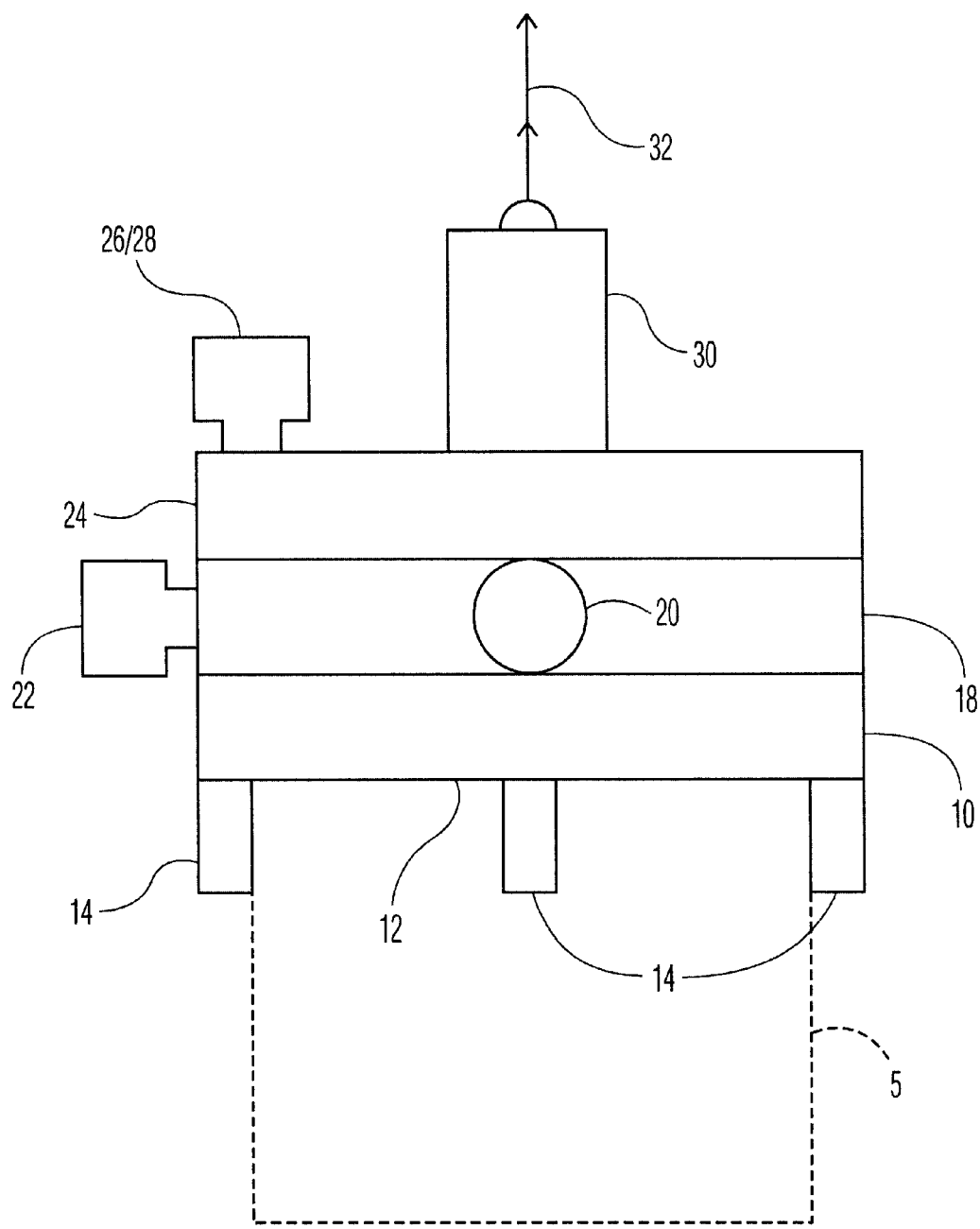
FIG. 2 is a front elevational view of the lens alignment apparatus of the subject invention.
Figure 3:
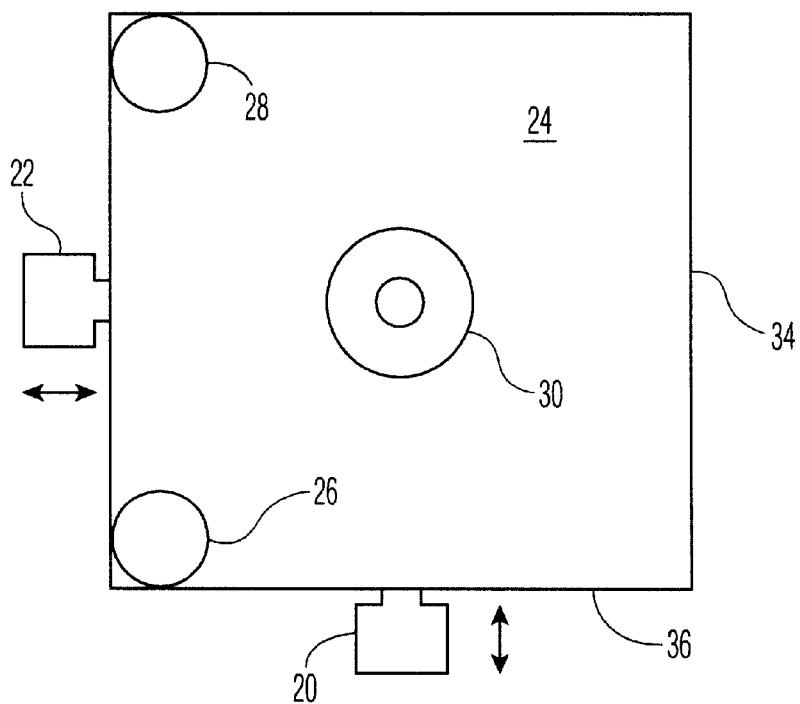
FIG. 3 is a top plan view of the lens alignment of FIG. 2.
Figure 4:
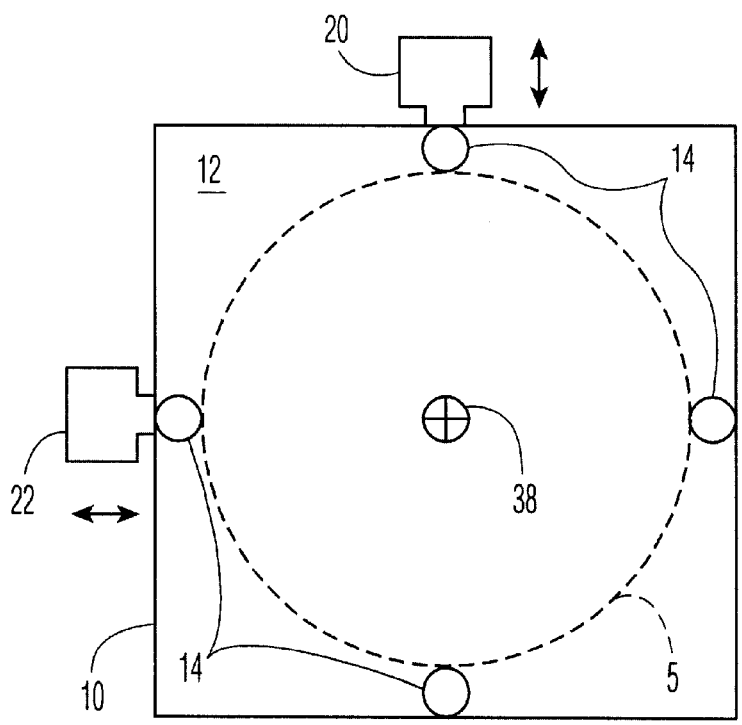
FIG. 4 is a bottom plan view of the lens alignment apparatus of FIG. 2.

FIGS. 2–4 shows the lens alignment apparatus of the subject invention. The lens alignment apparatus includes a base 10 having a bottom surface 12 for engaging the front surface of a projection lens assembly 5. Aligning-pins 14 extend from the bottom surface 12 of the. base 10 for frictionally engaging a circumferential surface of the projection lens assembly 5. A gimbal system is then mounted to the base 10. The gimbal system includes a bottom section 18 having means (not shown) for adjusting the position of the bottom section 18. in two orthogonal directions (see the two headed arrows in FIGS. 3 and 4) with respect to the base 10. The position adjusting means, which may be of any known design, includes adjusting knobs 20 and 22 which can be manually turned for adjusting the position of the bottom section 18. The gimbal system also includes a top section 24 having means (not shown) for adjusting a tilt of the top section about two axes (coaxial with the edges 34 and 36 shown in FIG. 3). The tilt adjusting means, which may also be of any known design, includes adjusting knobs 26 and 28 which can be manually turned for adjusting the tilt of top section 24 of the gimbal system.

The lens alignment apparatus further includes a laser beam generating device 30 mounted to the top section 24 of the gimbal system. The laser beam generating device 30 emits a visible red laser beam 32 which is used to check the alignment the lens. The laser beam generating device 30 includes energizing circuitry (not shown) for providing power to the laser beam generating device 30.

In operation, the lens alignment apparatus is calibrated by an operator, using the knobs 20/22. and 26/28, such that the laser beam is co-axial with a reference mark 38 on the base of the lens alignment apparatus, and such that the laser beam 32 is orthogonal to bottom surface 12 of the base 10 of the lens alignment apparatus. The lens alignment apparatus is then mounted onto the projection lens assembly 5 of the projection tube 4 such that the aligning pins 14 frictionally engage the projection lens assembly 5 and the bottom surface 12 is pressed against the front surface of the projection lens assembly 5. The laser beam generating device 30 is then energized and the emitted laser beam 32 is reflected by the mirrors 6 and 7, and forms a red dot on the rear projection screen. By observing this red dot and by making simple measurements, the alignment of the projection lens assembly 5 may then be checked.

Numerous alterations and modifications of. the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An alignment apparatus for checking the alignment of a lens of a projection tube in a rear projection television receiver, said apparatus comprising:

a base having a substantially flat bottom surface, said bottom surface having aligning pins protruding from the bottom surface of the base for frictionally engaging a circumferential surface of a housing in which the lens is mounted such that the bottom surface of the base is pressed against a front surface of the lens;

a gimbal system having a bottom section mounted to the base, and a top section, said gimbal system having first adjusting means for adjusting the top section with respect to the base in two orthogonal directions in a plane parallel to a plane of the bottom surface of the base, and second adjusting means for angularly adjusting the plane of the top surface with respect to the plane of the bottom surface of the base; and a laser beam generating device mounted on the top section of said gimbal system, whereby said first and second adjusting means enable a laser beam emitted from the laser beam generating device to be coaxial with a central axis of the lens.

2. A method for checking the alignment of a projection lens assembly in a rear projection television receiver, said method comprises:

mounting a laser beam generating device on a front surface of the projection lens assembly;

aligning an axis of a laser beam generated by the laser beam generating device to be coaxial with a central axis of the projection lens assembly; and observing a position of a light dot formed by the laser beam on a projection screen of the projection television receiver.

\* \* \* \* \*